United States Patent
Yee et al.

(10) Patent No.: US 9,933,312 B2
(45) Date of Patent: Apr. 3, 2018

(54) BOLOMETER FLUID FLOW AND TEMPERATURE SENSOR

(71) Applicant: Robert Bosch GmbH, Stuttgart (DE)

(72) Inventors: Seow Yuen Yee, Mountain View, CA (US); Gary Yama, Mountain View, CA (US); Thomas Rocznik, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/259,102

(22) Filed: Sep. 8, 2016

(65) Prior Publication Data

US 2018/0066994 A1    Mar. 8, 2018

(51) Int. Cl.
*G01J 5/00* (2006.01)
*G01J 5/20* (2006.01)

(52) U.S. Cl.
CPC ..................... *G01J 5/20* (2013.01)

(58) Field of Classification Search
CPC .... G01J 5/02; G01J 5/0285; G01J 5/04; G01J 5/20; G01J 5/06; G01J 5/12; G01J 2005/068; G01J 2005/065
See application file for complete search history.

(56) References Cited

U.S. PATENT DOCUMENTS

| 2007/0290134 | A1* | 12/2007 | Key | G01N 25/72 250/340 |
| 2009/0213895 | A1* | 8/2009 | Pillans | G01J 5/24 374/2 |
| 2013/0240738 | A1* | 9/2013 | Yon | G01J 5/02 250/349 |

FOREIGN PATENT DOCUMENTS

KR    2001045476 A  *  6/2001

* cited by examiner

*Primary Examiner* — Kiho Kim
(74) *Attorney, Agent, or Firm* — Maginot Moore & Beck LLP (57) ABSTRACT

The sensor comprises a reference bolometer and a plurality of sensing bolometers. Each sensing bolometer is arranged adjacent to the reference bolometer. Each bolometer comprises (i) a substrate, (ii) a cap structure connected to the substrate, the cap structure configured to define a cavity between an inner surface of the cap structure and a first surface of the substrate, (iii) an absorber connected the substrate and arranged within the cavity, the absorber configured to absorb infrared radiation within the cavity, and (iv) a readout circuit connected to the absorber and configured to provide a signal that indicates an amount of infrared radiation absorbed by the absorber. The cap structure of the reference bolometer blocks infrared radiation from entering the cavity from outside the cap structure. The cap structure of each sensing bolometers allows infrared radiation to enter the cavity from outside the cap structure.

20 Claims, 8 Drawing Sheets

BOLOMETER FLUID FLOW AND TEMPERATURE SENSOR

FIELD

The device and method disclosed in this document relates to bolometer based sensors and, more particularly, to a bolometer based fluid flow and temperature sensor.

BACKGROUND

A bolometer is a type of sensor used to measure electromagnetic radiation. A bolometer generally comprises an absorptive element that is connected via a thermal link to a heat sink or thermal reservoir (i.e. a body of constant or near-constant temperature). A thermometer or other temperature sensitive element is attached to or embedded into the absorptive element in order to measure a temperature of the absorptive element. In some bolometers, the absorptive element may itself be the temperature sensitive element.

The essential operating principle of a bolometer is that, when incident electromagnetic radiation or photons are absorbed by the absorptive element, the energy from the radiation raises the temperature of the absorptive element. The change in temperature is measured by the temperature sensitive element in order to measure a magnitude of the absorbed radiation. In order to detect certain types of radiation, the absorptive element can be configured for sensitivity to different ranges of wavelengths.

Figure 1:
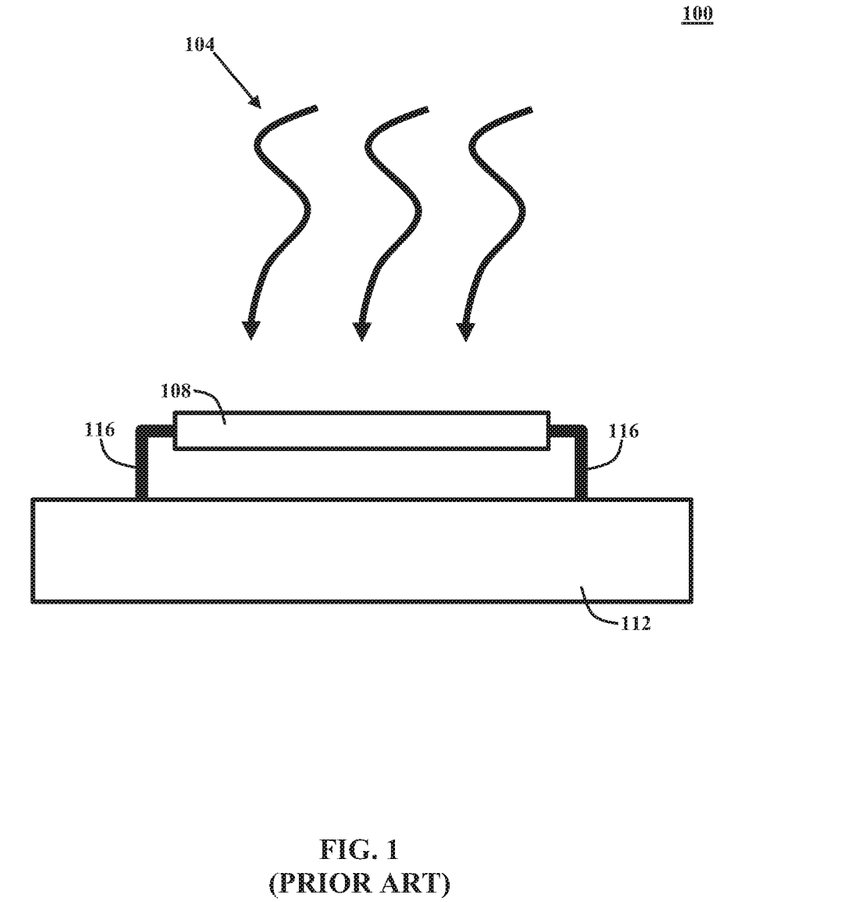
FIG. 1 shows a prior art microbolometer for detecting thermal radiation.

FIG. 1 shows a microbolometer 100 for detecting infrared radiation 104. The microbolometer 100 includes an absorber 108 which comprises a material configured to absorb infrared radiation and exhibit relatively changes in resistance as a result of small changes in temperature. For example, the absorber 108 may comprise of amorphous silicon or vanadium oxide. The absorber 108 is suspended above a substrate 112 by a pair of electrodes 116 in order to thermally isolate the absorber 108 from the substrate 112. A current or voltage is applied to the absorber 108 via the electrodes 116 and changes in resistance of the absorber 108 are monitored in order to detect the radiation 104.

One common use for a sensor such as the microbolometer 100 is for measuring thermal radiation. Objects at any non-zero temperature radiate electromagnetic energy. At temperatures near room temperature, objects primarily radiate infrared radiation, which can be detected by a sensor, such as the microbolometer 100. However, it would be advantageous to use bolometer sensors to implement other kinds of sensors, beyond simple radiation sensors.

SUMMARY

A fluid flow sensor is disclosed. The fluid flow sensor comprises a reference bolometer configured to provide a reference signal, the reference bolometer comprising: a substrate having a first surface; a cap structure connected to the substrate, the cap structure configured to define a cavity between an inner surface of the cap structure and the first surface of the substrate, the cap structure configured to block infrared radiation from entering the cavity from outside the cap structure; an absorber connected to the first surface of the substrate and arranged within the cavity, the absorber configured to absorb infrared radiation within the cavity; and a readout circuit connected to the absorber and configured to provide the reference signal that indicates an amount of infrared radiation absorbed by the absorber; and a plurality of sensing bolometers, each bolometer in the plurality of sensing bolometers arranged adjacent to the reference bolometer and configured to provide a measurement signal, each bolometer in the plurality of sensing bolometers comprising: a substrate having a first surface; a cap structure connected to the substrate, the cap structure configured to define a cavity between an inner surface of the cap structure and the first surface of the substrate, the cap structure configured to allow infrared radiation to enter the cavity from outside the cap structure; and an absorber connected to the first surface of the substrate and arranged within the cavity, the absorber configured to absorb infrared radiation within the cavity; and a readout circuit connected to the absorber and configured to provide the measurement signal that indicates an amount of infrared radiation absorbed by the absorber.

A method of operating a fluid flow sensor is disclosed. The method comprises receiving a reference signal from a reference bolometer, the reference bolometer comprising (i) a substrate having a first surface, (ii) a cap structure connected to the substrate, the cap structure configured to define a cavity between an inner surface of the cap structure and the first surface of the substrate, the cap structure configured to block infrared radiation from entering the cavity from outside the cap structure, (iii) an absorber connected to the first surface of the substrate and arranged within the cavity, the absorber configured to absorb infrared radiation within the cavity, and (iv) a readout circuit connected to the absorber and configured to provide the reference signal that indicates an amount of infrared radiation absorbed by the absorber; receiving a measurement signal from each bolometer in a plurality of sensing bolometers, each bolometer in the plurality of sensing bolometers arranged adjacent to the reference bolometer, each bolometer in the plurality of sensing bolometers comprising (i) a substrate having a first surface, (ii) a cap structure connected to the substrate, the cap structure configured to define a cavity between an inner surface of the cap structure and the first surface of the substrate, the cap structure configured to allow infrared radiation to enter the cavity from outside the cap structure, (iii) an absorber connected to the first surface of the substrate and arranged within the cavity, the absorber configured to absorb infrared radiation within the cavity, and (iv) a readout circuit connected to the absorber and configured to provide the measurement signal that indicates an amount of infrared radiation absorbed by the absorber; and determining a flow characteristic of a fluid that flows near the reference bolometer and the plurality of sensing bolometers based on the reference signal and the measurement signals from the bolometers of at least one bolometer in the plurality of sensing bolometers.

BRIEF DESCRIPTION OF THE DRAWINGS

The foregoing aspects and other features of the fluid flow sensor and method of operating the fluid flow sensor are explained in the following description, taken in connection with the accompanying drawings.

DETAILED DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

Figure 2:
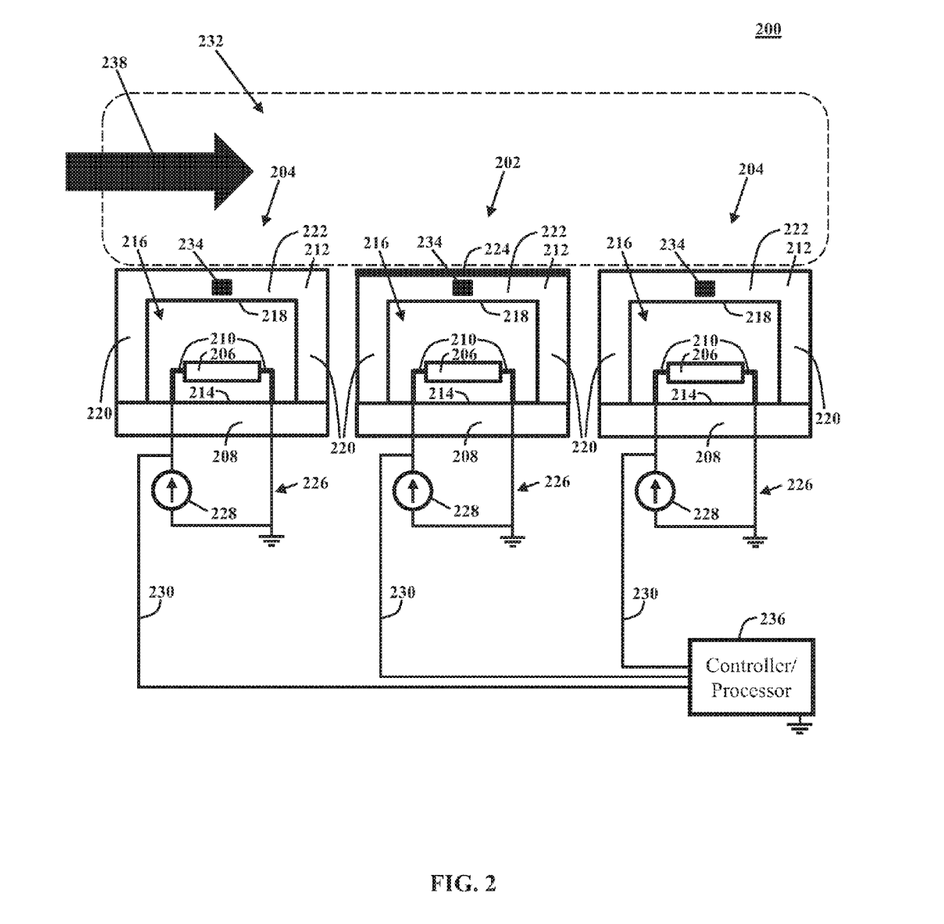
FIG. 2 shows a bolometer based fluid flow sensor.

FIG. 2 shows a fluid flow sensor 200. The fluid flow sensor 200 includes a reference bolometer 202 and one or more sensing bolometers 204. Each bolometer 202, 204 includes an absorber 206 suspended above a substrate 208 by a pair of electrodes 210. Each bolometer 202, 204 further includes a cap structure 212 formed upon or connected to an upper surface 214 of the substrate 208. The cap structure 212 has a shape configured to define a cavity 216 that encompasses the absorber 206. In particular, the cavity 216 is defined between an inner surface 218 of the cap structure 212 and the upper surface 214 of the substrate 208. In one embodiment, a near-vacuum pressure is present in the cavity 216. In one embodiment, the cap structure 212 includes wall portions 220 that extend from the upper surface 214 of the substrate 208. The wall portions 220 provide support for a top portion 222 of the cap structure 212 that is positioned above the absorber 206, opposite the substrate 208.

The cap structures 212 of the sensing bolometers 204 are comprised of an infrared transparent material, such as silicon. Accordingly, infrared radiation is allowed to pass through the top portion 222 of the cap structure 212 and enter the cavity 216 of the sensing bolometers 204. The infrared radiation is absorbed by the absorber 206, thereby increasing the temperature of the absorber 206. As a result, the sensing bolometers 204 are sensitive to thermal radiation emitted by objects near the fluid flow sensor 200, and thus the temperatures of said objects. Additionally, the sensing structure is sensitive to thermal radiation emitted from the cap structure 212 itself.

Conversely, the cap structure 212 of the reference bolometer 202 is configured to block infrared radiation from entering the cavity 216 of the reference bolometer 202. Particularly, in one embodiment, an infrared opaque layer of material 224 is deposited or attached to an upper surface of the top portion 222 of the cap structure 212. In other embodiments, the infrared opaque layer of material 224 can be sandwiched inside top portion 222 of the cap structure 212 or deposited on the inner surface 218 of the cap structure 212. In a further embodiment, the entire cap structure 212 can comprise of the infrared opaque material. In either case, the cap structure 212 does not allow infrared radiation to enter into the cavity 216 from outside the cap structure 212 of the reference bolometer 202. As a result, the reference bolometer 202 is not sensitive to thermal radiation emitted by objects near the fluid flow sensor 200. Instead, the reference bolometer 202 is primarily sensitive to thermal radiation emitted from the cap structure 212 itself, and thus sensitive to the temperature of the cap structure 212.

Each of the bolometers 202, 204 further comprise of a readout circuit 226 configured to provide a voltage output that is indicative of the amount of radiation absorbed by the respective absorber 206. In one embodiment, the readout circuit 226 is an integrated circuit built into the substrate 208. In other embodiments, the readout circuits 226 are separately provided. In the embodiment shown, the readout circuit 226 comprise of a constant-current source 228 configured to provide a constant current that flows through the absorber 206, via the electrodes 210. The readout circuit 226 provides the voltage across the absorber 206 as an output 230. In an alternative embodiment, the readout circuit 226 may also include a resistance (not shown) arranged in series with the absorber 206 to form a voltage divider. In this embodiment, a constant voltage source (not shown) applies a constant voltage across the voltage divider and either the voltage across the absorber 206 or the voltage across the series resistance is provided as the output 230.

The absorber 206 is comprised of a material configured to absorb infrared radiation and exhibit large changes in resistance as a result of small changes in temperature. For example, the absorber 206 may comprise of amorphous silicon or vanadium oxide. When infrared radiation is absorbed by an absorber 206 of one of the bolometers 202, 204, the temperature of the absorber 206 increases. In one embodiment, the absorber 206 has a negative temperature coefficient of resistance. Accordingly, as the temperature of the absorber 206 increases, the resistance between the respective electrodes 210 decreases. As a result of the constant-current source 228 providing a constant current through the absorber 206, the voltage across the absorber 206, and thus the voltage at the output 230, decreases proportionally with the decrease in resistance of the absorber 206. Alternatively, in another embodiment, the absorber 206 has a positive temperature coefficient of resistance. Accordingly, as the temperature of the absorber 206 increases, the resistance between the respective electrodes 210 increases. As a result of the constant-current source 228 providing a constant current through the absorber 206, the voltage across the absorber 206, and thus the voltage at the output 230, increases proportionally with the increase in resistance of the absorber 206.

In the embodiment shown in FIG. 2, there are two sensing bolometers 204 and one reference bolometer 202 that are arranged linearly in a row (along an axis from left to right on the page). However, further embodiments having additional sensing bolometers are described further below. The outer surface of the top portion 222 of each cap structure 212 faces in a common direction, toward a detection area 232. The effective detection area 232 may extend far into the distance away from the outer surfaces of the top portions 222 of the cap structures 212. The two sensing bolometers 204 are arranged opposite one another on either side of the reference bolometer 202. In one embodiment, the bolometers 202, 204 are connected together such that the outer surface of the top portion 222 of each cap structure 212 forms a smooth surface facing the detection area 232. In other embodiments, the bolometers 202, 204 are spaced apart by a defined distance.

In one embodiment, the fluid flow sensor 200 includes one or more heating elements 234 arranged within the cap structures 212 of the bolometers 202, 204. The heating elements 234 are not required for operation of the fluid flow sensor 200. However, as will be discussed in further detail below, sensitivity for fluid flow measurement may be improved by operating the heating elements 234 to warm the cap structures 212 to a predefined temperature that is greater than an ambient temperature. In one embodiment, the heating elements 234 are arranged only in the cap structure 212 of the reference bolometer 202. In other embodiments, the heating elements 234 are arranged in the cap structures 212 of sensing bolometers 204 and the reference bolometer 202. As shown, the heating elements 234 are arranged in the top portion 222 of the cap structures 212 of each bolometer 202, 204. However, in other embodiments, the heating elements 234 are alternatively arranged in the wall portions 220 of one or more of the cap structures 212.

The working principle of the fluid flow sensor 200 is based around detecting temperature changes in the cap structures 212 of the bolometers 202, 204 with the respective absorbers 206. Particularly, as a fluid 238 flows through a detection area 232, the cap structures 212 are cooled by the fluid 238. However, the fluid 238 does not cool the cap structures 212 uniformly. Particularly, a flow of the fluid 238 from left to right will begin cooling the cap structure 212 of the leftmost sensing bolometer 204 slightly before cooling the cap structure 212 of the reference bolometer 202. Similarly, a flow of the fluid 238 from left to right will begin cooling the cap structure 212 of the reference bolometer 202 before cooling the cap structure 212 of the rightmost sensing bolometer 204. This time delay can be detected by the absorbers 206 and used to determine a flow direction of the fluid 238.

Additionally, a flow of the fluid 238 in one direction will tend to create a temperature gradient between the cap structures 212 of the bolometers 202, 204. For example, when there is no fluid flow, the heating elements 234 are configured to heat each of the cap structures 212 to approximately the same temperature. However, if there is a flow of the fluid 238 from left to right, then a temperature gradient will manifest between each of the cap structures 212. Particularly, as the fluid 238 cools the cap structure 212 of the leftmost sensing bolometer 204, the fluid 238 is warmed and brings the warmth with it as it flows to the right. Accordingly, the cooling effect of the fluid 238 is lessened with respect to the cap structure 212 of the reference bolometer 202 and even further lessened with respect to the cap structure 212 of the rightmost sensing bolometer 204. In this way, if the fluid 238 flows from left to right, the cap structure 212 of the leftmost sensing bolometer 204 will cool more than the cap structure 212 of the reference bolometer 202, which in turn cools more than the cap structure 212 of the rightmost sensing bolometer 204. Furthermore, the magnitude of the temperature gradient will vary depending on a flow speed of the fluid 238. Particularly, if the fluid 238 is flowing rapidly, then the magnitude of the temperature gradient between the cap structures 212 is larger. Conversely, if the fluid 238 is flowing slowly, then the magnitude of the temperature gradient between the cap structures 212 is smaller. This temperature gradient can be detected by the absorbers 206 and used to determine a flow direction of the fluid 238 and a flow speed of the fluid 238.

Additionally, it is noted that if the fluid 238 is warmer than the cap structures 212, then it may warm the cap structures 212 rather than cool the cap structures 212 as described above. However, a time delay in the warming of the cap structures 212 and a temperature gradient between the cap structures 212 can be similarly detected by the absorbers 206 and used to determine a flow direction of the fluid 238.

Additionally, in embodiments having the heating elements 234, the heating elements can be driven to maintain a constant temperature in the cap structures. Accordingly, when the fluid 238 flows, a change in power required to maintain the constant temperature can be detected for the purpose of detecting a time delay or gradient as discussed above.

Figure 3:
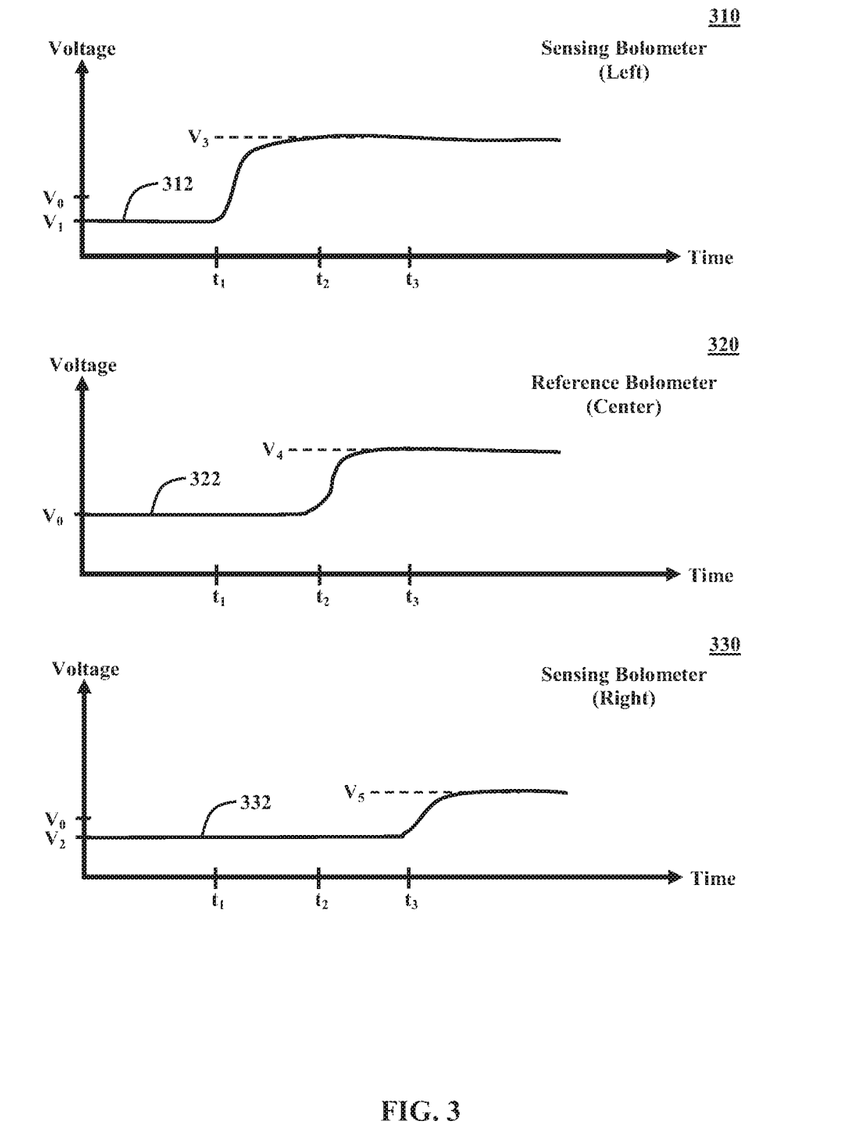
FIG. 3 shows exemplary output signals over time from the fluid flow sensor of FIG. 2, while a fluid begins flowing from left to right.

FIG. 3 shows exemplary output signals over time from fluid flow sensor 200 while the fluid 238 begins flowing from left to right. The plot 310 shows a measurement signal 312 that is output from readout circuit 226 of the leftmost sensing bolometer 204 shown in FIG. 2. Similarly, the plot 320 shows a reference signal 322 that is output from the readout circuit 226 of the reference bolometer 202 shown in FIG. 2. Finally, the plot 330 shows a measurement signal 332 that is output from the readout circuit 226 of the rightmost sensing bolometer 204 shown in FIG. 2.

Prior to a time $t_1$, the fluid 238 is not flowing in either direction along the left-right axis. As shown in FIG. 3, during this time, the reference signal 322 has a voltage $V_0$ which reflects an amount of thermal radiation being radiated by the cap structure 212 of the reference bolometer 202. The value of $V_0$ generally reflects a temperature of the cap structures 212 of each of the bolometers 202, 204, which should be roughly the same temperature in the absence of any significant fluid flow in the detection area 232.

As shown in FIG. 3, prior to the time $t_1$, the measurement signals 312 and 332 from the sensing bolometers 204 have voltages $V_1$ and $V_2$, respectively. The voltages $V_1$ and $V_2$ are generally slightly less than the voltage $V_0$. Particularly, the voltages $V_1$ and $V_2$ reflect not only an amount of thermal radiation being radiated by the cap structure 212 of the respective sensing bolometers 204, but also an amount of thermal radiation entering into the cavity 216 through cap structures 212 from objects in the detection area 232. Accordingly, the absorbers 206 of the sensing bolometers 204 are slightly warmer and have a slightly lower resistance than the absorber 206 of the reference bolometer 202. The difference between the voltage $V_1$ or $V_2$ and the voltage $V_0$ reflects an approximate amount of thermal radiation entering into the respective cavity 216 from objects in the detection area 232.

At a time $t_1$, the fluid 238 begins to flow from the left to the right. As the fluid 238 flows across the outer surfaces of the top portions 222 of the cap structures 212, the cap structures 212 begin to cool due to conductive and/or convective transfer of heat from the cap structures 212 to the fluid 238 and away from the fluid flow sensor 200. However, since the fluid 238 is flowing from the left to the right, the cap structure 212 of the leftmost sensing bolometer 204 begins to cool before the cap structure 212 of the reference bolometer 202 and the cap structure 212 of the reference bolometer 202 begins to cool before the cap structure 212 of the rightmost sensing bolometer 204. Particularly, as shown in FIG. 3, the measurement signal 312 from the leftmost sensing bolometer 204 begins to increase at the time $t_1$, as a result of a cooling of the cap structure 212 of the leftmost sensing bolometer 204. Similarly, the reference signal 322 from the reference bolometer 202 begins to increase at a time $t_2$, which is subsequent to the time $t_1$, as a result of a cooling of the cap structure 212 of the reference bolometer 202. Finally, the measurement signal 332 from the rightmost sensing bolometer 204 begins to increase at the time $t_3$, which is subsequent to the time $t_1$ and the time $t_2$, as a result of a cooling of the cap structure 212 of the rightmost sensing bolometer 204. It is noted that differences between the times $t_1$, $t_2$, and $t_3$ has been exaggerating in the plots of FIG. 3 for illustration of this phenomenon. A comparison the times $t_1$, $t_2$, and $t_3$ can be performed to determine a direction of flow of the fluid 238.

As discussed above, the flow of the fluid 238 also creates a temperature gradient. The effect of this temperature gradient on the reference signal 322 and the measurement signals 312 and 332 is also demonstrated in FIG. 3. As the cap structure 212 of the leftmost sensing bolometer 204 cools, the measurement signal 312 increases from the voltage $V_1$ to a voltage $V_3$. Assuming that the amount of infrared radiation entering the cavity 216 remains similar, the difference between the voltage $V_3$ and the voltage $V_1$ reflects an approximate amount of cooling that has occurred in the cap structure 212 of the leftmost sensing bolometer 204. Similarly, as the cap structure 212 of the reference bolometer 204 cools, the reference signal 322 increases from the voltage $V_0$ to a voltage $V_4$. The difference between the voltage $V_4$ and the voltage $V_0$ reflects an approximate amount of cooling that has occurred in the cap structure 212 of the reference bolometer 202. Finally, as the cap structure 212 of the rightmost sensing bolometer 204 cools, the measurement signal 332 increases from the voltage $V_2$ to a voltage $V_5$. Assuming that the amount of infrared radiation entering the cavity 216 remains similar, the difference between the voltage $V_5$ and the voltage $V_2$ reflects an approximate amount of cooling that has occurred in the cap structure 212 of the rightmost sensing bolometer 204. It is noted that, depending of the flow speed of the fluid 238 and the operating temperature of the heating elements 234, the cap structure 212 of the rightmost sensing bolometer 204 may not actually cool at all and may even heat up slightly due to the flow of the fluid 238 from left to right. Nevertheless, a comparison the voltages $V_0$, $V_1$, $V_2$, $V_3$, $V_4$, and $V_5$ can be performed to determine a direction of flow of the fluid 238. A comparison of the voltages $V_0$, $V_1$, $V_2$, $V_3$, $V_4$, and $V_5$ can also be performed to determine a flow speed of the fluid 238.

Returning to FIG. 2, in one embodiment, the fluid flow sensor 200 further includes a controller 236. In one embodiment, the controller 236 is a discrete control device such as a microcontroller, or other programmable logic device. In other embodiments, the functions of the controller 236 are implemented by a processor of an electronic device in which the fluid flow sensor 200 is integrated. The controller 236 is configured to receive the outputs 230 from the readout circuits 226 of the bolometers 202, 204. In one embodiment, the controller is operably connected to drive circuits for operating the heating elements 234 and configured to operate the heating elements 234 to warm the cap structures 212 to a particular temperature. In one embodiment, the controller is configured to operate the heating elements 234 to maintain a constant temperature in the cap structures 212. The controller 236 is configured to determine flow characteristics, such as flow direction and flow speed, of the fluid 238 flowing through the detection area 232 based on the outputs 230 from the readout circuits 226 of the bolometers 202, 204. In one embodiment, the controller 236 is further configured to determine the flow characteristics, at least in part based on a power requirement of the heating elements 234 to maintain a constant temperature in the cap structure. In one embodiment, the controller 236 is further configured to determine a temperature in the detection area 232 based on the outputs 230 from the readout circuits 226 of the bolometers 202, 204.

Methods for operating the fluid flow sensor 200 are described below. In the description of the methods, statements that a method is performing some task or function refers to a controller or general purpose processor executing programmed instructions stored in non-transitory computer readable storage media operatively connected to the controller or processor to manipulate data or to operate one or more components to perform the task or function. Particularly, the controller 236 above or a processor of an electronic device in which the fluid flow sensor 200 is integrated can be such a controller or processor. Alternatively, the methods can be implemented with more than one processor and associated circuitry and components, each of which is configured to form one or more tasks or functions described herein. Additionally, the steps of the methods may be performed in any feasible chronological order, regardless of the order shown in the figures or the order in which the steps are described.

Figure 4:
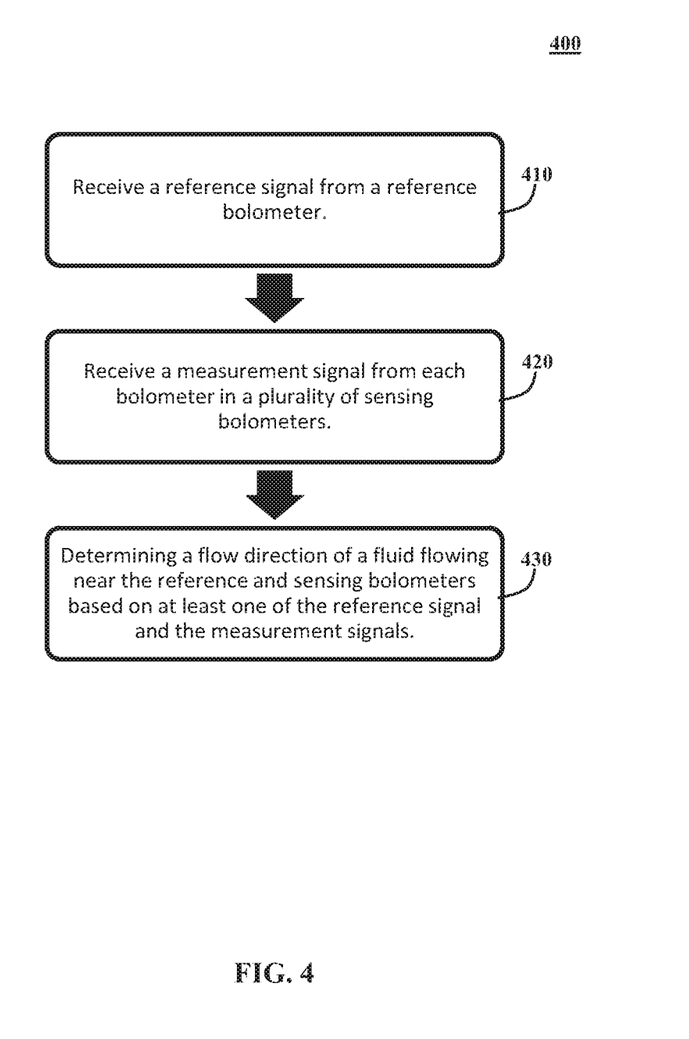
FIG. 4 shows a method of operating the fluid flow sensor of FIG. 2 to determine a flow direction of a fluid.

FIG. 4 shows a method 400 of operating the fluid flow sensor 200 to determine a flow direction of the fluid 238. The method 400 begins with receiving a reference signal from the bolometer (block 410). Particularly, when the reference bolometer 202 is powered up, the readout circuit 226 of the reference bolometer 202 provides a reference signal at its output 230 that is representative of an amount of radiation being absorbed by the absorber 206 of the reference bolometer 202. The controller 236 is configured to receive the reference signal from the readout circuit 226 of the reference bolometer 202. The method 400 continues with receiving a measurement signal from each bolometer in a plurality of sensing bolometer (block 420). Particularly, when the sensing bolometers 202 are powered up, the readout circuits 226 of the sensing bolometer 202 each provide a measurement signal at their respective outputs 230 that is representative of an amount of radiation being absorbed by the absorber 206 of the reference bolometer 202. The controller 236 is configured to receive the measurement signals from the readout circuits 226 of the sensing bolometers 204. The method 400 continues with determining a flow direction of a fluid flowing near the reference and sensing bolometers based on at least one of the reference signal and the measurement signals (block 430). Particularly, as discussed in further detail below, the controller 236 is configured to determine a flow direction of the fluid 238 flowing through the detection area 232 based on at least one of the reference signal and the measurement signals.

In one implementation of the block 430, the method 400 determines the flow direction of the fluid based on which cap structure started cooling first. Particularly, in one embodiment, the controller 236 is configured to detect that an amount of infrared radiation being absorbed by the absorber 206 of the leftmost sensing bolometer 204 has begun to decrease at a first point in time (reflecting a time at which the cap structure 212 of the leftmost sensing bolometer 204 began cooling) based on the measurement signal from the readout circuit 226 of the leftmost sensing bolometer 204. Additionally, the controller 236 is configured to detect that an amount of infrared radiation being absorbed by the absorber 206 of the reference bolometer 202 has begun to decrease at a second point in time (reflecting a time at which the cap structure 212 of the reference bolometer 202 began cooling) based on the reference signal from the readout circuit 226 of the reference bolometer 202. Finally, the controller 236 is configured to determine that the fluid 238 is flowing in a direction from the leftmost sensing bolometer 204 toward the reference bolometer 202 (i.e. left to right) in response to the second point in time being subsequent in time to the first point in time (reflecting that the cap structure 212 of the leftmost sensing bolometer 204 began cooling before the cap structure 212 of the reference bolometer 202). The controller 236 makes a similar determination that the fluid 238 is flowing from left to right if the cap structure 212 of the leftmost sensing bolometer 204 begins cooling before the cap structure 212 of the rightmost sensing bolometer 204, or if the cap structure 212 of the reference bolometer 202 begins cooling before the cap structure 212 of the rightmost sensing bolometer 204. Conversely, the controller 236 makes similar a determination that the fluid 238 is flowing from right to left if the cap structure 212 of the rightmost sensing bolometer 204 begins cooling before the cap structure 212 of the reference bolometer 202, if the cap structure 212 of the rightmost sensing bolometer 204 begins cooling before the cap structure 212 of the leftmost sensing bolometer, or if the cap structure 212 of the reference bolometer 202 begins cooling before the cap structure 212 of the leftmost sensing bolometer 204. Put more simply, with respect to the plots of FIG. 3, the controller 236 determines that the fluid 238 is flowing from left to right if $t_1<t_2$, if $t_2<t_3$, and/or if $t_1<t_3$ and determines that the fluid 238 is flowing from right to left if $t_1>t_2$, if $t_2>t_3$, and/or if $t_1>t_3$.

In one implementation of the block 430, the method 400 determines the flow direction of the fluid based on a change in the temperature gradient between the cap structures of the bolometers. Particularly, in one embodiment, the controller 236 is configured to detect that an amount of infrared radiation being absorbed by the absorber 206 of the leftmost sensing bolometer 204 has decreased by a first amount since it began decreasing (reflecting an amount that the cap structure 212 of the leftmost sensing bolometer 204 has cooled) based on the measurement signal from the readout circuit 226 of the leftmost sensing bolometer 204. Additionally, the controller 236 is configured to detect that an amount of infrared radiation being absorbed by the absorber 206 of the reference bolometer 202 has decreased by a second amount since it began decreasing (reflecting an amount that the cap structure 212 of the reference bolometer 202 has cooled) based on the reference signal from the readout circuit 226 of the reference bolometer 202. Finally, the controller 236 is configured to determine that the fluid 238 is flowing in a direction from the leftmost sensing bolometer 204 toward the reference bolometer 202 (i.e. left to right) in response to the second amount of decrease being less than the first amount of decrease (reflecting that the cap structure 212 of the leftmost sensing bolometer 204 has cooled more than the cap structure 212 of the reference bolometer 202). The controller 236 makes a similar determination that the fluid 238 is flowing from left to right if the cap structure 212 of the leftmost sensing bolometer 204 has cooled more than the cap structure 212 of the rightmost sensing bolometer 204, or if the cap structure 212 of the reference bolometer 202 has cooled more than the cap structure 212 of the rightmost sensing bolometer 204. Conversely, the controller 236 makes a determination that the fluid 238 is flowing from right to left if the cap structure 212 of the rightmost sensing bolometer 204 has cooled more than the cap structure 212 of the reference bolometer 202, if the cap structure 212 of the rightmost sensing bolometer 204 has cooled more than the cap structure 212 of the leftmost sensing bolometer, or if the cap structure 212 of the reference bolometer 202 has cooled more than the cap structure 212 of the leftmost sensing bolometer 204. Put more simply, with respect to the plots of FIG. 3, the controller 236 determines that the fluid 238 is flowing from left to right if $V_3-V_1>V_4-V_0$, if $V_4-V_0>V_5-V_2$, and/or if $V_3-V_1>V_5-V_2$ and determines that the fluid 238 is flowing from right to left if $V_3-V_1<V_4-V_0$, if $V_4-V_0<V_5-V_2$, and/or if $V_3-V_1<V_5-V_2$.

In one implementation of the block 430, the method 400 determines the flow direction of the fluid based on the absolute temperature gradient between the cap structures of the bolometers. Particularly, if it is assumed that the cap structure 212 of the leftmost sensing bolometer 204 and the cap structure 212 of the rightmost sensing bolometer 204 are exposed to roughly the same amount of external infrared radiation from the detection area 232, then the flow direction of the fluid can be detected by simply comparing the measurement signals directly, instead detecting a change in the measurement signals. In one embodiment, the controller 236 is configured to determine that the fluid 238 is flowing in a direction from the leftmost sensing bolometer 204 toward the reference bolometer 202 (i.e. left to right) in response to (i) the measurement signal from to leftmost sensing bolometer 204 indicating that a first amount of infrared radiation is being absorbed by the absorber 206 of the leftmost sensing bolometer 204 (reflecting a temperature of the cap structure 212 of the leftmost sensing bolometer 204), (ii) the measurement signal from the rightmost sensing bolometer 204 indicating that a second amount of infrared radiation is being absorbed by the absorber 206 of the rightmost sensing bolometer 204 (reflecting a temperature of the cap structure 212 of the rightmost sensing bolometer 204), and (iii) the second amount of infrared radiation being greater than the first amount of infrared radiation (reflecting that the cap structure 212 of the leftmost sensing bolometer 204 is cooler than the cap structure 212 of the rightmost sensing bolometer 204). Conversely, the controller 236 makes a similar determination that the fluid 238 is flowing from right to left if the cap structure 212 of the rightmost sensing bolometer 204 is cooler than the cap structure 212 of the leftmost sensing bolometer 204. Put more simply, with respect to the plots of FIG. 3, the controller 236 determines that the fluid 238 is flowing from left to right if $V_3>V_5$ determines that the fluid 238 is flowing from right to left if $V_3<V_5$.

Figure 5:
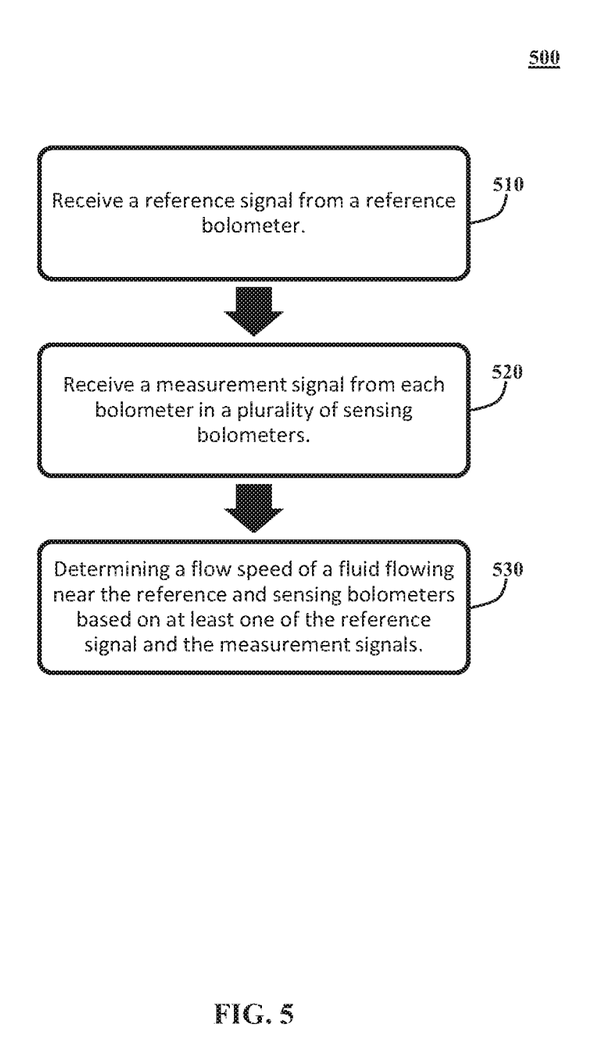
FIG. 5 shows a method of operating the fluid flow sensor of FIG. 2 to determine a flow speed of a fluid.

FIG. 5 shows a method 500 of operating the fluid flow sensor 200 to determine a flow speed of the fluid 238. The method 500 begins with receiving a reference signal from the bolometer (block 510). Particularly, the controller 236 is configured to receive the reference signal from the readout circuit 226 of the reference bolometer 202. The method 500 continues with receiving a measurement signal from each bolometer in a plurality of sensing bolometer (block 520). Particularly, the controller 236 is configured to receive the measurement signals from the readout circuits 226 of the sensing bolometers 204. The method 500 continues with determining a flow speed of a fluid flowing near the reference and sensing bolometers based on at least one of the reference signal and the measurement signals (block 530). Particularly, as discussed in further detail below, the controller 236 is configured to determine a flow speed of the fluid 238 flowing through the detection area 232 based on at least one of the reference signal and the measurement signals.

In one implementation of the block 530, the method 500 determines the flow direction of the fluid based on magnitude of a change in a temperature gradient between the cap structures of the bolometers. Particularly, in one embodiment, the controller 236 is configured to detect that an amount of infrared radiation being absorbed by the absorber 206 of the leftmost sensing bolometer 204 has decreased by a first amount since it began decreasing (reflecting an amount that the cap structure 212 of the leftmost sensing bolometer 204 has cooled) based on the measurement signal from the readout circuit 226 of the leftmost sensing bolometer 204. Additionally, the controller 236 is configured to detect that an amount of infrared radiation being absorbed by the absorber 206 of the reference bolometer 202 has decreased by a second amount since it began decreasing (reflecting an amount that the cap structure 212 of the reference bolometer 202 has cooled) based on the reference signal from the readout circuit 226 of the reference bolometer 202. Finally, the controller 236 is configured to determine a speed at which the fluid 238 is flowing in a direction from the leftmost sensing bolometer 204 toward the rightmost sensing bolometer 204 (i.e. left to right) based on a difference between the first amount of decrease and the second amount of decrease (reflecting a difference in the amount that the cap structure 212 of the leftmost sensing bolometer 204 has cooled and the amount that the cap structure 212 of the rightmost sensing bolometer 204 has cooled). Alternatively, the controller 236 makes a similar determination of the speed at which the fluid 238 is flowing based on the difference between the amount that the cap structure 212 of the leftmost sensing bolometer 204 has cooled and the amount that the cap structure 212 of the reference bolometer 202 has cooled, or based on the difference between the amount that the cap structure 212 of the rightmost sensing bolometer 204 has cooled and the amount that the cap structure 212 of the reference bolometer 202 has cooled. Put more simply, with respect to the plots of FIG. 3, the controller 236 determines the speed at which the fluid 238 is flowing based on a difference between $V_3-V_1$ and $V_4-V_0$, a difference between $V_4-V_0$ and $V_5-V_2$, and/or a difference between $V_3-V_1$ and $V_5-V_2$.

In one implementation of the block 530, the method 500 determines the flow direction of the fluid based on magnitude of a change in a temperature gradient between the cap structures of the bolometers. Particularly, in one embodiment, the controller 236 is configured to determine a speed at which the fluid 238 is flowing in a direction from the leftmost sensing bolometer 204 toward the rightmost sensing bolometer 204 (i.e. left to right) based on a difference between (i) an amount of infrared radiation being absorbed by the absorber 206 of the leftmost sensing bolometer 204 (reflecting a temperature of the cap structure 212 of the leftmost sensing bolometer 204) and (ii) an amount of infrared radiation being absorbed by the absorber 206 of the rightmost sensing bolometer 204 (reflecting a temperature of the cap structure 212 of the leftmost sensing bolometer 204). Alternatively, the controller 236 makes a similar determination of the speed at which the fluid 238 is flowing based on the difference between the temperature of the cap structure 212 of the leftmost sensing bolometer 204 and the temperature of the cap structure 212 of the reference bolometer 202, or based on the difference between the temperature of cap structure 212 of the rightmost sensing bolometer 204 and the temperature of the cap structure 212 of the reference bolometer 202. Put more simply, with respect to the plots of FIG. 3, the controller 236 determines the speed at which the fluid 238 is flowing based on a difference between $V_3$ and $V_4$, a difference between $V_4$ and $V_5$, and/or a difference between $V_3$ and $V_5$.

It is noted that if the fluid 238 is warmer than the cap structure 212, then it may warm the cap structures 212 rather than cool the cap structures 212 as described above. However, a time delay in the warming of the cap structure 212 and a temperature gradient within the cap structures 212 can be similarly be detected by the absorbers 206 and used to determine a flow direction of the fluid 238. Additionally, it is noted that similar methods for detecting fluid flow direction and flow speed can be implemented in a fluid flow sensor having cooling elements (rather than the heating elements 324) configured to cooling the cap structures 212 to a temperature that is lower than the ambient temperature. In such an embodiment, fluid flow would cause a warming of the cap structures 212 and the methods could detect the warming to determine fluid flow direction and speed. Additionally, such methods could be implemented without a heating element or cooling element in the case where the fluid is warmer or cooler than the ambient temperature, such as in the case of detecting human breath blowing on the fluid flow sensor.

Figure 6:
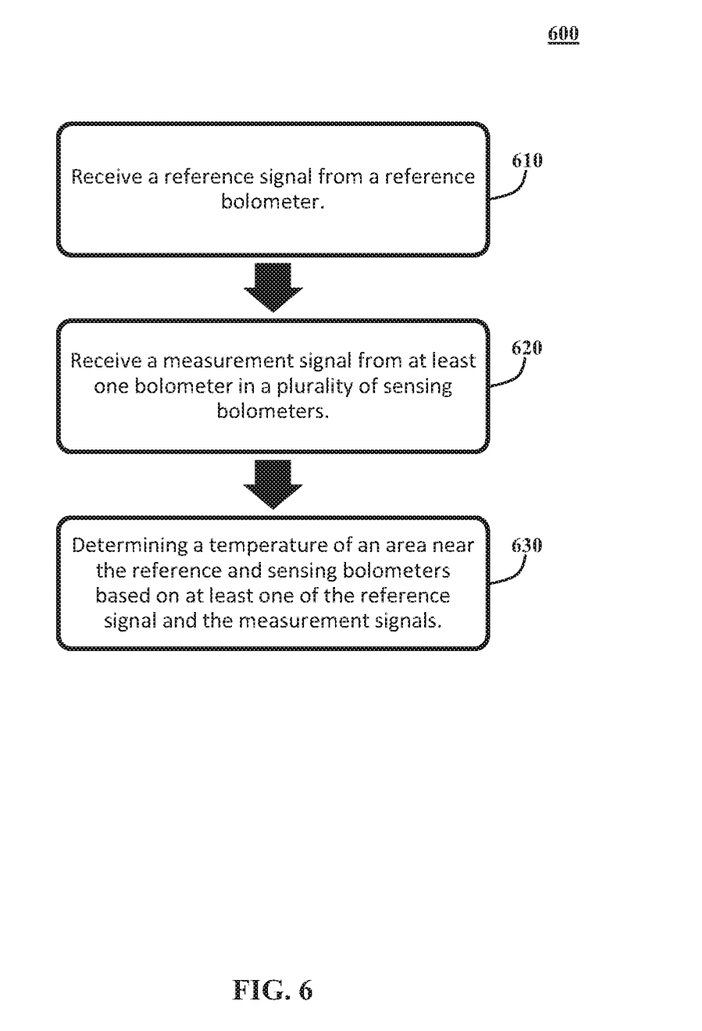
FIG. 6 shows a method of operating the fluid flow sensor of FIG. 2 to determine a temperature in a detection area.

FIG. 6 shows a method 600 of operating the fluid flow sensor 200 to determine a temperature in the detection area 232. The method 600 begins with receiving a reference signal from the bolometer (block 610). Particularly, the controller 236 is configured to receive the reference signal from the readout circuit 226 of the reference bolometer 202. The method 600 continues with receiving a measurement signal from at least one bolometer in a plurality of sensing bolometer (block 620). Particularly, the controller 236 is configured to receive the measurement signals from the readout circuits 226 of the sensing bolometers 204. The method 600 continues with determining a temperature of an area near the reference and sensing bolometers based on at least one of the reference signal and the measurement signals (block 630). Particularly, as discussed in further detail below, the controller 236 is configured to determine a temperature of the detection area 232 based on at least one of the reference signal and the measurement signals. It is noted that for effective temperature sensing, the temperature being detected generally must be greater than the temperature of the bolometers 202, 204. Accordingly, in some cases, the heating elements 234 are turned off and the bolometers 202, 204 are allowed to cool before sensing temperatures.

In one embodiment, the controller 236 is configured to determine the temperature of the detection area 232 based on the difference between on a difference between (i) an amount of infrared radiation being absorbed by the absorber 206 of the leftmost sensing bolometer 204 (reflecting a temperature of the cap structure 212 of leftmost sensing bolometer 204, as well as a temperature of the detection area) and (ii) an amount of infrared radiation being absorbed by the absorber 206 of the rightmost sensing bolometer 204 (reflecting a temperature of the cap structure 212 of the reference bolometer 204). By determining this difference, the effect of thermal radiation that is radiated from the cap structure 212 is removed and only the thermal radiation that enters from the detection area 232 is accounted for. In one embodiment, a temperature is also determined based on the rightmost sensing bolometer 204 compared with the reference bolometer 202. Put more simply, with respect to the plots of FIG. 3, the controller 236 determines the temperature of the detection area 232 based on a difference between $V_1$ and $V_0$ or a difference between $V_2$ and $V_0$. However, if the fluid 238 is flowing enough to create a temperature gradient in the cap structures 212, then the temperature indicated by the leftmost sensing bolometer 204 is averaged with the temperature indicated by the rightmost bolometer. In other words, with respect to the plots of FIG. 3, the controller 236 determines the temperature of the detection area 232 based on a difference between $AVG(V_3, V_5)$ and $V_4$.

Figure 7:
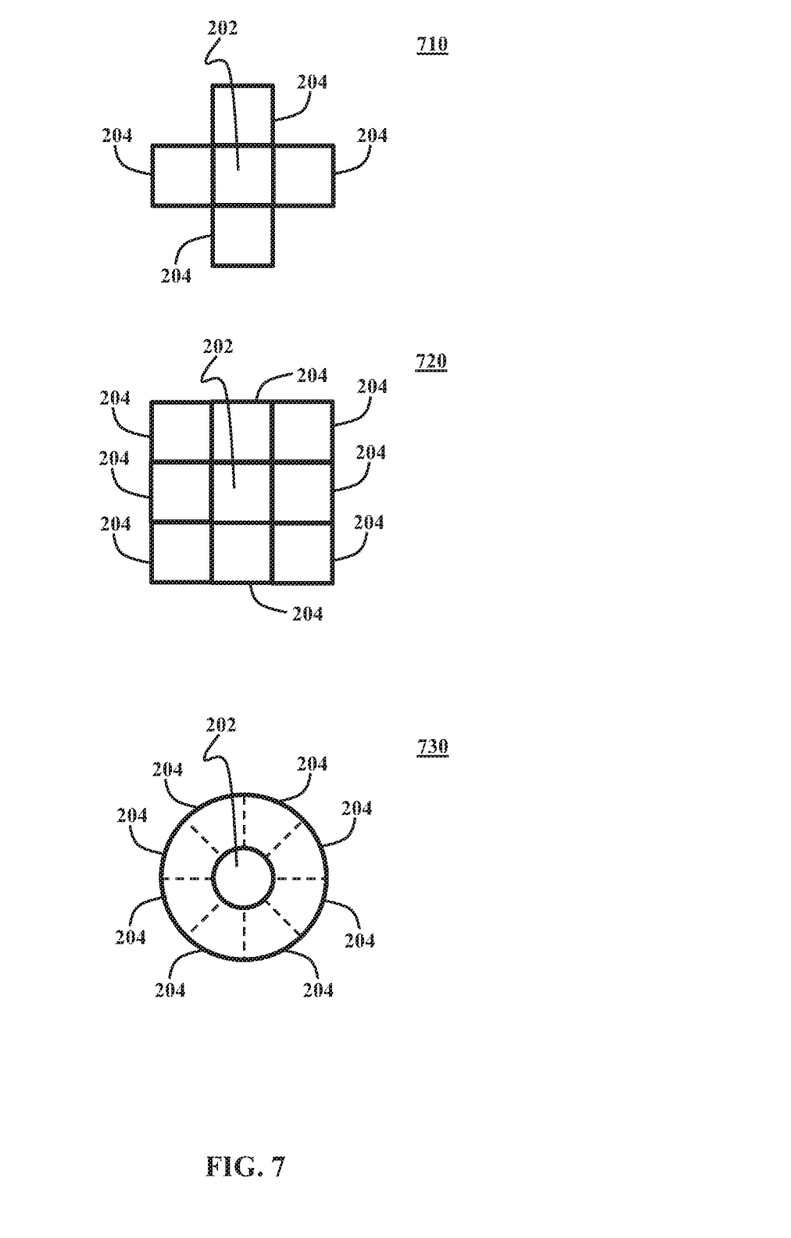
FIG. 7 shows possible arrangements of a reference bolometer and sensing bolometers to enable multi-axis fluid flow sensing.

FIG. 7 shows further possible arrangements of a reference bolometer 202 and a plurality of sensing bolometers 204 to enable multi-axis fluid flow sensing. The arrangement 710 includes four sensing bolometers 204 arranged adjacent to a reference bolometer 202. The principles described above can be applied to the arrangement 710 for two-axis fluid flow sensing (i.e. left-right axis, and up-down axis as shown in FIG. 7). The arrangement 720 includes eight sensing bolometers 204 arranged adjacent to a reference bolometer 202. The principles described above can be applied to the arrangement 720 for four-axis fluid flow sensing (i.e. left-right axis, up-down axis, and two diagonal axes as shown in FIG. 7). Finally, the arrangement 730 includes a plurality of sensing bolometers 204 arranged symmetrically around a reference bolometer 202. The principles described above can be applied to the arrangement 730 for n-axis fluid flow sensing (where n depends on how many sensing bolometers 204 are included).

In one embodiment, the fluid flow sensor 200 is integrated into a portable electronic device, such as a smartphone. The smartphone may include applications that utilize the fluid flow sensor 200 to implement certain functions, such as displaying the flow data, generating pop-ups or warnings based on the flow data, or performing other operations in response to the flow data. One example of such an operation is to use the fluid flow sensor 200 to generate thermal images. Particularly, by integrating the functionalities of temperature sensing and fluid flow sensing, a user can "paint" across an area of interest with the smartphone to generate a thermal image of the area.

Figure 8:
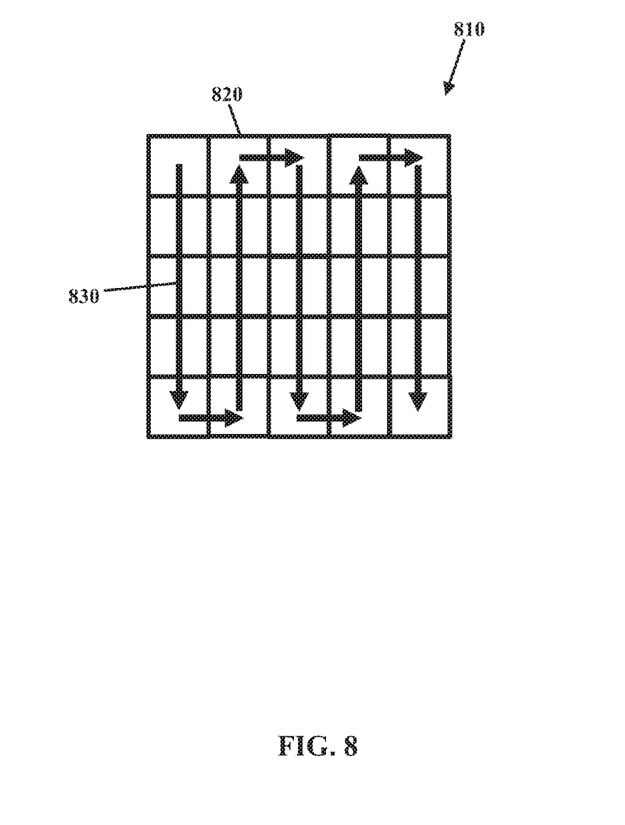
FIG. 8 shows an area of interest of which a thermal image can be made using a fluid flow sensor according to the disclosure.

FIG. 8 shows an area of interest 810 that is divided into a plurality of sub-areas 820. The user can move the smartphone or other device having the fluid flow sensor 200 along a path 830 that covers each of the sub-areas. As the fluid flow sensor 200 is moved along the path 830, the movements that define the path 830 can be determined and recorded based on the flow of the air in front of the fluid flow sensor. Particularly, in one embodiment, the controller 236 is configured to determine movements of the fluid flow sensor 200 through space based on determined flow characteristics, including flow direction and flow speed, of a fluid the flows near the fluid flow sensor.

As the fluid flow sensor 200 is moved along the path 830, the temperature at each sub-area 820 can be determined and associated with a position or sub-area 820 in the area of interest 810. Particularly, in one embodiment, the controller 236 is configured to determine a temperature of an area near the fluid flow sensor 200 based on the reference signal from the reference bolometer 202 and the measurement signal from at least one of the sensing bolometers. The controller 236 is further configured to associate the temperature with a relative position in space based on the determined movements of the fluid flow sensor 200. After the fluid flow sensor 200 is has been moved along the path 830 so as to cover the entire area of interest 810, the temperatures associated with each sub-area 820 can be used to generate a thermal image or thermal map of the area of interest.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A sensor comprising:
   a reference bolometer configured to provide a reference signal, the reference bolometer comprising:
      a substrate having a first surface;
      a cap structure connected to the substrate, the cap structure configured to define a cavity between an inner surface of the cap structure and the first surface of the substrate, the cap structure configured to block infrared radiation from entering the cavity from outside the cap structure;
      an absorber connected to the first surface of the substrate and arranged within the cavity, the absorber configured to absorb infrared radiation within the cavity; and
      a readout circuit connected to the absorber and configured to provide the reference signal that indicates an amount of infrared radiation absorbed by the absorber;
   a plurality of sensing bolometers, each bolometer in the plurality of sensing bolometers arranged adjacent to the reference bolometer and configured to provide a measurement signal, each bolometer in the plurality of sensing bolometers comprising:
      a substrate having a first surface;
      a cap structure connected to the substrate, the cap structure configured to define a cavity between an inner surface of the cap structure and the first surface of the substrate, the cap structure configured to at least partially allow infrared radiation to enter the cavity from outside the cap structure; and
      an absorber connected to the first surface of the substrate and arranged within the cavity, the absorber configured to absorb infrared radiation within the cavity; and
      a readout circuit connected to the absorber and configured to provide the measurement signal that indicates an amount of infrared radiation absorbed by the absorber; and
   a controller operably connected to the readout circuit of reference bolometer and to the readout circuit of each bolometer in the plurality of sensing bolometers, the controller being configured to:
      receive the reference signal from the reference bolometer and the respective measurement signal from each bolometer in the plurality of sensing bolometers; and
      determine at least one flow characteristic of a fluid that flows near the reference bolometer and the plurality of sensing bolometers based on a comparison of at least two of the reference signal and the measurement signals from the plurality of sensing bolometers,
      wherein the at least one flow characteristic includes at least one of (i) a direction in which the fluid is flowing and (ii) a speed at which the fluid is flowing.

2. The sensor of claim 1 further comprising:
   at least one heating element configured to heat the cap structure of the reference bolometer and the cap structures of the bolometers in the plurality of sensing bolometers.

3. The sensor of claim 1, wherein:
   a first bolometer in the plurality of sensing bolometers is arranged adjacent to the reference bolometer in a first direction from the reference bolometer; and
   a second bolometer in the plurality of sensing bolometers is arranged adjacent to the reference bolometer in a second direction from the reference bolometer, the second direction being opposite the first direction.

4. The sensor of claim 3, wherein:
   a third bolometer in the plurality of sensing bolometers is arranged adjacent to the reference bolometer in a third direction from the reference bolometer that is perpendicular to the first direction; and
   a fourth bolometer in the plurality of sensing bolometers is arranged adjacent to the reference bolometer in a fourth direction from the reference bolometer that is opposite the third direction.

5. The sensor of claim 1, wherein the bolometers in the plurality of sensing bolometers are symmetrically arranged around the reference bolometer.

6. The sensor of claim 1, the controller being further configured to:
detect at least one of (i) a first amount of infrared radiation being absorbed by the absorber of a first bolometer in the plurality of sensing bolometers, (ii) that the first amount of infrared radiation being absorbed by the absorber of the first bolometer began to change at a first point in time, and (iii) that the first amount of infrared radiation being absorbed by the absorber of the first bolometer has changed by a second amount, based on the measurement signal from the first bolometer; and
determine the at least one flow characteristic of the fluid based on at least one of (i) the first amount, (ii) the first point in time, and (iii) the second amount.

7. The sensor of claim 1, the controller being further configured to:
detect that an amount of infrared radiation being absorbed by the absorber of a first bolometer in the plurality of sensing bolometers began to change at a first point in time based on the measurement signal from the first bolometer;
detect that an amount of infrared radiation being absorbed by the absorber of the reference bolometer began to change at a second point in time based on the reference signal; and
determine which direction the fluid is flowing between the first bolometer and the reference bolometer based on a comparison of the first point in time and the second point in time.

8. The sensor of claim 1, the controller being further configured to:
detect that an amount of infrared radiation being absorbed by the absorber of a first bolometer in the plurality of sensing bolometers began to change at a first point in time based on the measurement signal from the first bolometer;
detect that an amount of infrared radiation being absorbed by the absorber of a second bolometer in the plurality of sensing bolometers began to change at a second point in time based on the measurement signal from the second bolometer; and
determine which direction the fluid is flowing between the first bolometer and the second bolometer based on a comparison of the first point in time and the second point in time.

9. The sensor of claim 1, the controller being further configured to:
detect that an amount of infrared radiation being absorbed by the absorber of a first bolometer in the plurality of sensing bolometers has changed by a first amount based on the measurement signal from the first bolometer;
detect that an amount of infrared radiation being absorbed by the absorber of the reference bolometer has changed by a second amount based on the reference signal; and
determine which direction the fluid is flowing between the first bolometer and the reference bolometer based on a comparison of the first amount and the second amount.

10. The sensor of claim 1, the controller being further configured to:
detect that an amount of infrared radiation being absorbed by the absorber of a first bolometer in the plurality of sensing bolometers has changed by a first amount based on the measurement signal from the first bolometer;
detect that an amount of infrared radiation being absorbed by the absorber of a second bolometer in the plurality of sensing bolometers has changed by a second amount based on the measurement signal from the second bolometer; and
determine which direction the fluid is flowing between the first bolometer and the second bolometer based on a comparison of the first amount and the second amount.

11. The sensor of claim 1, the controller being further configured to:
detect that a first amount of infrared radiation is being absorbed by the absorber of a first bolometer in the plurality of sensing bolometers based on the measurement signal from the first bolometer;
detect that a second amount of infrared radiation is being absorbed by the absorber of a second bolometer in the plurality of sensing bolometers based on the measurement signal from the second bolometer; and
determine which direction the fluid is flowing between the first bolometer and the second bolometer based on a comparison of the first amount and the second amount.

12. The sensor of claim 1, the controller being further configured to:
detect that an amount of infrared radiation being absorbed by the absorber of a first bolometer in the plurality of sensing bolometers has changed by a first amount based on the measurement signal from the first bolometer;
detect that an amount of infrared radiation being absorbed by the absorber of a second bolometer in the plurality of sensing bolometers has changed by a second amount based on the measurement signal from the second bolometer; and
determine the speed at which the fluid is flowing in a direction from the first bolometer toward the second bolometer based on a difference between the first amount and the second amount.

13. The sensor of claim 1, the controller being further configured to:
detect that a first amount of infrared radiation is being absorbed by the absorber of a first bolometer in the plurality of sensing bolometers based on the measurement signal from the first bolometer;
detect that a second amount of infrared radiation is being absorbed by the absorber of a second bolometer in the plurality of sensing bolometers based on the measurement signal from the second bolometer; and
determine the speed at which the fluid is flowing in a direction from the first bolometer toward the second bolometer based on a difference between the first amount and the second amount.

14. The sensor of claim 1, the controller being further configured to:
determine movements of the reference bolometer and the plurality of sensing bolometers through space based on the determined at least one flow characteristic.

15. The sensor of claim 14, the controller being further configured to:
determine a temperature of an area near the cap structures of the reference bolometer and the plurality of sensing bolometers based on the reference signal and the measurement signals from the bolometers of at least one bolometer in the plurality of sensing bolometers; and
associate the temperature with a relative position in space based on the determined movements.

16. The sensor of claim 15, the controller being further configured to:

generate a thermal image by repeating the processes of determining the temperature and associating the temperature with the relative position in space as the reference bolometer and the plurality of sensing bolometers moves through space.

17. A method of operating a sensor, the method comprising:
receiving a reference signal from a reference bolometer, the reference bolometer comprising (i) a substrate having a first surface, (ii) a cap structure connected to the substrate, the cap structure configured to define a cavity between an inner surface of the cap structure and the first surface of the substrate, the cap structure configured to block infrared radiation from entering the cavity from outside the cap structure, (iii) an absorber connected to the first surface of the substrate and arranged within the cavity, the absorber configured to absorb infrared radiation within the cavity, and (iv) a readout circuit connected to the absorber and configured to provide the reference signal that indicates an amount of infrared radiation absorbed by the absorber;
receiving a measurement signal from each bolometer in a plurality of sensing bolometers, each bolometer in the plurality of sensing bolometers arranged adjacent to the reference bolometer, each bolometer in the plurality of sensing bolometers comprising (i) a substrate having a first surface, (ii) a cap structure connected to the substrate, the cap structure configured to define a cavity between an inner surface of the cap structure and the first surface of the substrate, the cap structure configured to at least partially allow infrared radiation to enter the cavity from outside the cap structure, (iii) an absorber connected to the first surface of the substrate and arranged within the cavity, the absorber configured to absorb infrared radiation within the cavity, and (iv) a readout circuit connected to the absorber and configured to provide the measurement signal that indicates an amount of infrared radiation absorbed by the absorber; and
determining at least one flow characteristic of a fluid that flows near the reference bolometer and the plurality of sensing bolometers based on a comparison of at least two of the reference signal and the measurement signals from the plurality of sensing bolometers
wherein the at least one flow characteristic includes at least one of (i) a direction in which the fluid is flowing and (ii) a speed at which the fluid is flowing.

18. The method of claim 17, the determining of the at least one flow characteristic of the fluid further comprising:
determining which direction the fluid is flowing between a first bolometer in the plurality of sensing bolometers and one of (i) the reference bolometer and (ii) a second bolometer in the plurality of sensing bolometers based on a comparison of the measurement signal from the first bolometer with at least one of the reference signal and the measurement signal from the second bolometer.

19. The method of claim 17, the determining of the at least one flow characteristic of the fluid further comprising:
determine a speed at which the fluid is flowing in a direction from a first bolometer in the plurality of sensing bolometers toward one of (i) the reference bolometer and (ii) a second bolometer in the plurality of sensing bolometers based on a comparison of the measurement signal from the first bolometer with at least one of the reference signal and the measurement signal from the second bolometer.

20. The method of claim 17, the determining of the at least one flow characteristic of the fluid further comprising:
detecting at least one of (i) a first amount of infrared radiation being absorbed by the absorber of a first bolometer in the plurality of sensing bolometers, (ii) that the first amount of infrared radiation being absorbed by the absorber of the first bolometer began to change at a first point in time, and (iii) that the first amount of infrared radiation being absorbed by the absorber of the first bolometer has changed by a second amount, based on the measurement signal from the first bolometer; and
determining the at least one flow characteristic of the fluid based on at least one of (i) the first amount, (ii) the first point in time, and (iii) the second amount.

* * * * *